US009313644B2

(12) United States Patent
Lamberton et al.

(10) Patent No.: US 9,313,644 B2
(45) Date of Patent: Apr. 12, 2016

(54) MODULE MLR FOR MANAGING MACHINE-TO-MACHINE TYPE (M2M) MOBILE DEVICES

(75) Inventors: Marc Lamberton, Antibes (FR); Philippe Bouckaert, Biot (FR); Gilles Coppe, Valbonne (FR); Jean-Rene Bouvier, Biviers (FR)

(73) Assignee: BUZZINBEES, Seyssinet Pariset (FR)

( * ) Notice: Subject to any disclaimer, the term of this patent is extended or adjusted under 35 U.S.C. 154(b) by 16 days.

(21) Appl. No.: 14/343,499

(22) PCT Filed: Sep. 10, 2012

(86) PCT No.: PCT/EP2012/067674
§ 371 (c)(1),
(2), (4) Date: Jun. 4, 2014

(87) PCT Pub. No.: WO2013/034772
PCT Pub. Date: Mar. 14, 2013

(65) Prior Publication Data
US 2014/0308917 A1    Oct. 16, 2014

(30) Foreign Application Priority Data

Sep. 9, 2011 (EP) .................................... 11306123

(51) Int. Cl.
*H04M 11/00* (2006.01)
*H04W 8/06* (2009.01)
(Continued)

(52) U.S. Cl.
CPC ................ *H04W 8/06* (2013.01); *H04W 4/005* (2013.01); *H04W 4/14* (2013.01); *H04W 12/06* (2013.01);
(Continued)

(58) Field of Classification Search
CPC ....... H04W 4/00; H04W 4/005; H04W 4/006; H04W 4/12; H04W 4/14; H04W 4/24; H04W 16/00; H04W 24/04; H04W 12/06; H04W 12/08; H04W 88/14; H04W 88/184; H04W 8/04; H04W 8/06

USPC ........ 455/406, 414.1, 412.1, 417, 432.3, 433, 455/435.1, 556.1, 466
See application file for complete search history.

(56) References Cited

U.S. PATENT DOCUMENTS

2008/0153521 A1   6/2008 Benaouda et al.
2009/0264162 A1 * 10/2009 Ramachandran et al. .... 455/572
(Continued)

FOREIGN PATENT DOCUMENTS

EP          2 341 660  A1     7/2011

OTHER PUBLICATIONS

Acision: "3GPP TSG SA WG2 Meeting '85, S2-112763, MTC triggering w/o E164 MSISDN using MT SMS addressing formats", 3GPP Draft; S2-112763, 3rd Generation Partnership Project (3GPP), Mobile Competence Centre May 23, 2011, pp. 1-5, XP050525768.
(Continued)

*Primary Examiner* — Jean Gelin
(74) *Attorney, Agent, or Firm* — Young & Thompson (57) ABSTRACT

A Module connected through a communication network to at least a measuring mobile terminal, at least a mobile switch center and at least a machine to machine application, the module includes: a home location register configured to provide on demand, for a given measuring mobile terminal, an address of the mobile switch center through which the measuring mobile terminal is connected to the cellular communication network, an authentication center authenticating a given measuring mobile terminal, at least one short message service center configured to transmit the message towards a measuring mobile terminal, a short message service center interfaced between the cellular communication network and the machine to machine application, the home location register, the authentication center, the short message service center and the short message service center being embedded in a single physical structure forming at least in part the module.

20 Claims, 6 Drawing Sheets (51) Int. Cl.
*H04W 4/00* (2009.01)
*H04W 88/14* (2009.01)
*H04W 4/14* (2009.01)
*H04W 12/06* (2009.01)
*H04W 8/04* (2009.01)
*H04W 88/16* (2009.01)
*H04W 88/18* (2009.01)
*H04L 29/12* (2006.01)

(52) U.S. Cl.
CPC ............... *H04W 88/14* (2013.01); *H04L 61/20* (2013.01); *H04L 61/605* (2013.01); *H04W 8/04* (2013.01); *H04W 88/16* (2013.01); *H04W 88/184* (2013.01)

(56) References Cited

U.S. PATENT DOCUMENTS

2010/0069095 A1* 3/2010 Yahav et al. .................. 455/466
2010/0159879 A1 6/2010 Salkini et al.
2012/0202508 A1 8/2012 Toth et al.

OTHER PUBLICATIONS

Anonymous: "The Mobile Industry's First All-In-One Network Solution Supporting WCDMA, HSPA+ and L TE", Tecore networks, Feb. 14, 2011, pp. 1-2, XP002668250, Retrieved from the Internet: URL:http://www.tecore.com/solutions/Tecore Networks-Datasheet-2G-3G-4GNetworkInABox.pdf [retrieved on Jan. 27, 2012].

International Search Report, dated Dec. 12, 2013, from corresponding PCT application.

EP Search Report, dated Jan. 30, 2012, from corresponding EP application.

* cited by examiner

MODULE MLR FOR MANAGING MACHINE-TO-MACHINE TYPE (M2M) MOBILE DEVICES

BACKGROUND OF THE INVENTION

The technical domain of the invention is the domain of cellular communication networks and especially when these cellular communication networks are used to communicate from machine to machine, M2M, where the cellular communication network allows data exchange between machines.

In such a machine to machine framework, it is known to connect several machines between them by means of at least one communication network, in order to allow data exchange between the different machines. It is advantageous, in order to allow the mobility of a machine, or simply to remove a wired link, even for a static machine, to extend said communication network by including a wireless cellular communication network. An advantageous candidate, due to its large geographical widespread, is a cellular communication network.

A machine to machine application M2MA communicates and exchanges data with at least one measuring mobile terminal MMT the case occurring, through a cellular communication network. According to said paradigm, a measuring mobile terminal becomes a subscriber of said cellular communication network and must logically receive a public subscriber phone number MSISDN in order to be called and/or to receive a message through the cellular communication network.

In an illustrative application, a measuring mobile terminal MMT may comprise a measuring sensor. A typical measuring application may comprise a great number of measuring sensors. The allocation of a public subscriber phone number MSISDN to each measuring mobile terminal is not a viable solution in the long term, since the number of available public subscriber phone numbers MSISDN is limited.

Contrarily to a phone call which transmits a large data volume over a wireless medium for a long duration, continuously and singularly, a measuring mobile terminal MMT transmits a small data volume, for instance a single measure, for a very short duration, but periodically repeats the operation with a number of occurrences that can be considerable. The billing paradigms, based on call and/or duration used for phone calls are no longer appropriate to a machine to machine application.

Furthermore, many of the cellular network resources like the Home Location Register (HLR), the Short Messages Service Center (SMSC) or the Authentication Center (AUC) are delocalized over different places and do not belong to the same proprietor that therefore cannot optimize their interoperation in view of a specific application like M2M devices actually are.

BRIEF SUMMARY OF THE INVENTION

A first object of the present invention is to disclose a cellular communication network system, that at least partially solves the aforementioned drawbacks; the cellular communication network system comprises at least one machine to machine application (M2MA) configured to receive and respectively transmit said message from and to the mobile switch center (MSC)/visitor location register (VLR), and that comprises at least one module (MLR) comprising:
  a home location register (HLR) configured to provide on demand, for a given measuring mobile terminal (MMT), an address of the mobile switch center (MSC)/visitor location register (VLR) through which the measuring mobile terminal (MMT) is connected to the cellular communication network,
  an authentication center (AuC) authenticating a given measuring mobile terminal (MMT),
  at least one short message service center (SMSC) configured to transmit the message towards a measuring mobile terminal (MMT),
  an application gateway (M2MGW) interfaced between the cellular communication network and the machine to machine application (M2MA).

Another object of the present invention is therefore to disclose a Module (MLR) connected through a communication network to at least a measuring mobile terminal (MMT), at least a mobile switch center (MSC)/visitor location register (VLR) and at least a machine to machine application (M2MA), and that comprises:
  a home location register (HLR) configured to provide on demand, for a given measuring mobile terminal (MMT), an address of the mobile switch center (MSC)/visitor location register (VLR) through which said measuring mobile terminal (MMT) is connected to the cellular communication network,
  an authentication center (AuC) authenticating a given measuring mobile terminal (MMT),
  at least one short message service center (SMSC) configured to transmit the message towards a measuring mobile terminal (MMT),
  an short message service center (SMSC) interfaced between the cellular communication network and said machine to machine application (M2MA), the home location register (HLR), the authentication center (AuC), the short message service center (SMSC) and the application gateway (M2MGW) being embedded in a single physical structure forming at least in part the module (MLR).

According to another embodiment, the invention relates to a Module (MLR) connected through a communication network to at least a measuring mobile terminal (MMT), at least a mobile switch center (MSC)/visitor location register (VLR) and at least a machine to machine application (M2MA), the module (MLR) comprising:
  at least one short message service center (SMSC) configured to transmit a message towards a measuring mobile terminal (MMT),
  a home location register (HLR) configured to, in response to a demand from the short message service center (SMSC) regarding a given measuring mobile terminal, (MMT), provide the short message service center (SMSC) with an address of the mobile switch center (MSC)/visitor location register (VLR) through which said measuring mobile terminal (MMT) is connected to the cellular communication network,
  an authentication center (AuC) authenticating a given measuring mobile terminal (MMT),
  the module (MLR) being configured to create a gathered billing call data record (CDR) for several connections of a same measuring mobile terminal (MMT) or of a group of measuring mobile terminals (MMT), gathered based on a time duration or based on transmitted data volume;
  the home location register (HLR), the authentication center (AuC) and the short message service center (SMSC) being embedded in a single physical structure forming at least in part the module (MLR).

Another object of the present invention is therefore to disclose a method of managing of a cellular communication network system, characterized in that:

a) it comprises the step of transmitting data between a machine to machine application (M2MA) and at least one measuring mobile terminal (MMT) through a module (MLR); the module (MLR) comprising:
a home location register (HLR) sending on demand, for a given measuring mobile terminal (MMT), an address of the mobile switch center (MSC) through which said measuring mobile terminal (MMT) is connected to the cellular communication network,
an authentication center (AuC) authenticating a given measuring mobile terminal (MMT),
at least one short message service center (SMSC) transmitting the message towards the measuring mobile terminal (MMT),
an application gateway (M2MGW) performing the step of interfacing the cellular communication network with said machine to machine application (M2MA) b) it comprises the step of connecting the at least one measuring mobile terminal (MMT) to the cellular communication network and disconnecting at least one measuring mobile terminal (MMT) out of the cellular communication network upon the completion of data transmission.

Another object of the present invention is a method of managing a cellular communication network system comprising a module (MLR) according to the invention, characterized in that it comprises the following steps performed by the module (MLR) to transmit a message from a M2MA toward a measuring mobile terminal (MMT):
a) a step of receiving a message to be transmitted to a given measuring mobile terminal (MMT), said message comprising a private device identifier (PDID) identifying said measuring mobile terminal (MMT),
b) a step of retrieving, based at least on said private device identifier (PDID), an address of a mobile switch center (MSC)/visitor location register (VLR) through which said measuring mobile terminal (MMT) is connected to the cellular communication network,
c) a step of transmitting said message to the mobile switch center (MSC)/visitor location register (VLR) through which said measuring mobile terminal (MMT) is connected to the cellular communication network, based on the retrieved address.

Before starting a detailed description of the preferred embodiments illustrated by the figures, several optional features of the herewith disclosed invention are briefly introduced hereinafter.

According to a preferred embodiment of the present invention, the cellular communication network system comprises a module (MLR) according to the invention, at least one mobile switching center (MSC)/visitor location register (VLR) and at least one measuring mobile terminal (MMT), said measuring mobile terminal (MMT) comprises means to wireless transmit and receive data and is configured to receive and respectively transmit at least one message to and respectively from at least one mobile switching center (MSC)/visitor location register (VLR).

According to a preferred embodiment of the present invention the short message service center (SMSC) is a SMS message service center or a USSD message service center.

According to a preferred embodiment of the present invention said module (MLR) comprises a single database (BDD) including data relating to a plurality of measuring mobile terminals (MMT) therein associated.

According to a preferred embodiment of the present invention the cellular network communication system comprises the measuring mobile terminal (MMT) that possesses a temporary public subscriber phone number.

According to a preferred embodiment of the present invention the module (MLR) is configured to allocate a temporary public subscriber phone number to a measuring mobile terminals (MMT). Preferably, the temporary public subscriber phone number is a MSISDN number. Preferably, the module (MLR) is configured to allocate said MSISDN according to at least one criterion.

According to a preferred embodiment of the present invention said module (MLR) comprises means to manage a plurality of private device identifier numbers (PDID); the private device identifier numbers (PDID) being private numbers not accessible to the public.

According to a preferred embodiment of the present invention said private identifier number (PDID) is assigned to one single measuring mobile terminal (MMT).

According to a preferred embodiment of the present invention the means to manage the plurality of private device identifier numbers (PDID) comprise the database (BDD).

According to an embodiment the module (MLR) comprises a database (BDD) configured to store a plurality of private device identifier numbers (PDID) assigned to each of the measuring mobile terminal (MMT), the private device identifier numbers (PDID) being private numbers not accessible to the public.

According to an embodiment, the cellular communication network system of the invention, comprises a further home location register (HLR) that is not embedded in the single physical structure forming at least in part the module (MLR) and that is independent on the module (MLR) and wherein the home location register (HLR) embedded in the module (MLR) is dedicated to mobile terminals (MMT).

According to a preferred embodiment of the present invention the method of managing of a cellular communication network system comprises step of temporary allocating a public subscriber phone number (MSISDN) for a measuring mobile terminal (MMT) during its connection to the cellular communication network.

According to a preferred embodiment of the present invention it is disclosed the step of allocating a private device identifier (PDID) number, to each measuring mobile terminal mobile (MMT).

According to a preferred embodiment of the present invention the allocation of the private device identifier (PDID) is permanent.

According to a preferred embodiment of the present invention the method comprises a step of keeping correspondence between said private device identifier (PDID) and a universal single identifier (IMSI) of a measuring mobile terminal (MMT).

According to a preferred embodiment of the present invention wherein the module (MLR) a gathered billing call data record (CDR) for several connections of a same measuring mobile terminal (MMT) or of a group of measuring mobile terminals (MMT), gathered based on duration or based on transmitted data volume.

According to a preferred embodiment of the present invention said measuring mobile terminal (MMT) connects to said module (MLR) according to a time division multiple access criterion.

According to a preferred embodiment of the present invention, the module (MLR) comprises or is connected to a database (BDD) that stores for each measuring mobile terminal (MMT): a universal single identifier (IMSI) and/or a private device identifier (PDID), and the address (MSC@) of the mobile switch center MSC/visitor location register (VLR) through which the measuring mobile terminal MMT is connected to the communication network. In addition, the module (MLR) and more particularly the home location register (HLR) of the module (MLR) is configured to, in response to said demand from the short message service center (SMSC) regarding a given measuring mobile terminal (MMT), request said database (BDD) to provide the address of the mobile switch center (MSC)/visitor location register (VLR) through which said measuring mobile terminal (MMT) is connected to the cellular communication network. Then the HLR receives from the database (BDD) the address of the mobile switch center (MSC)/visitor location register (VLR) and transmits it to the short message service center (SMSC). Advantageously, in the request sent by the HLR, the MMT is identified by its PDID or by its IMSI.

According to a preferred embodiment the module (MLR) comprises an accounting database configured to store information related to each connection of a measuring mobile terminal (MMT) received at the module (MLR). The module (MLR) also comprises a module referred to as charging mediation optimizer (CMO) configured to:

receive information related to each connection received at the module (MLR); provide said information to the accounting database;

upon occurrence of a predetermined event, retrieve from the accounting database (ADB) information related to a given mobile measuring terminal (MMT) or to a group of mobile measuring terminals (MMT), said predetermined event being preferably any one of: a predetermined time and date, a predetermined time duration, the reception of an instruction;

gather said information based on a time duration or based on transmitted data volume; create a call data record (CDR) comprising said gathered information;

send said call data record (CDR) to a billing system (BSS) of the communication network.

According to a preferred embodiment the module (MLR) executes the following steps for disconnecting the measuring mobile terminal (MMT) from the communication network:

the module (MLR) receives from a machine to machine (M2MA) a message for disconnecting the measuring mobile terminal (MMT) along with an identifier (PDID, IMSI) that identifies uniquely of the measuring mobile terminal (MMT); based on said identifier (PDID, IMSI) the module (MLR) retrieves from a database the address of a mobile switch center (MSC)/visitor location register (VLR) through which said measuring mobile terminal (MMT) is connected to the cellular communication network;

the module (MLR) sends to the mobile switch center (MSC)/visitor location register (VLR) for which the address has been retrieved an instruction to disconnect the measuring mobile terminal (MMT).

According to a preferred embodiment, the module (MLR) creates a gathered billing call data record (CDR) for several connections of a same measuring mobile terminal (MMT) gathered based on duration or based on transmitted data volume, the call data record (CDR) comprising at least: a volume of data sent by the measuring mobile terminal (MMT) and an identifier (PDID, IMSI) of the measuring mobile terminal (MMT).

According to a preferred embodiment, the module (MLR) creates a gathered billing call data record (CDR) for several connections of a group of measuring mobile terminals (MMT), gathered based on duration or based on transmitted data volume, the call data record (CDR) comprising a volume of data sent by the group of measuring mobile terminals (MMT) and at least any one of: an identifier of the group of measuring mobile terminals (MMT), an identifier of a subscriber of a machine to machine application processing measurement data created by the group of measuring mobile terminals (MMT).

According to a preferred embodiment of the present invention at least part of the measuring mobile terminals (MMT) connect to said module (MLR) on a same time. According to a preferred embodiment of the present invention the module (MLR) keeps correspondence between said private device identifier (PDID), a temporary public subscriber phone number (MSISDN) and an international mobile subscriber identity number (IMSI) of said measuring mobile terminal (MMT) while the measuring mobile terminal (MMT) is connected to the network.

BRIEF DESCRIPTION OF THE DRAWINGS

Others features, details and advantages of the invention will become more apparent from the detailed illustrating description given hereafter with respect to the drawings on which.

DETAILED DESCRIPTION OF THE PREFERRED EMBODIMENTS

Figure 1:
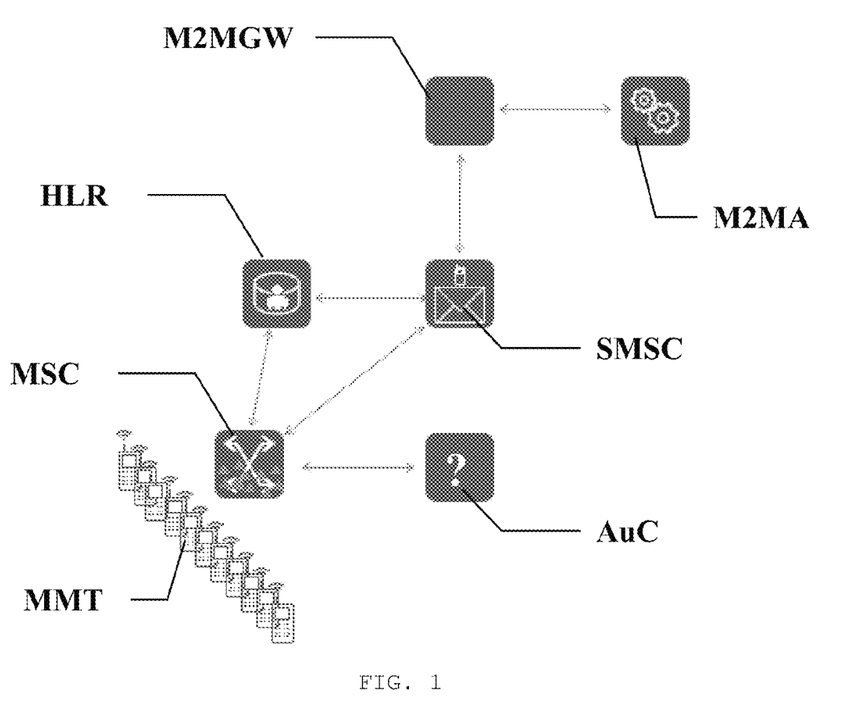
FIG. 1 shows a schematic view of a communication network according to prior art.

According to prior art, as illustrated in FIG. 1, showing a partial illustrative view of a communication network, comprising a cellular communication radio network, some data exchanges occur between on one hand at least one measuring mobile terminal MMT and on the other hand a machine to machine application M2MA. A measuring mobile terminal MMT is able to collect at least one measure, for example periodically. The machine to machine application M2MA is able to centrally gather said measures collected by said at least one measuring mobile terminal MMT and to exploit said measures. For that purpose, a communication network is used which comprises at least one cellular communication network.

In the following, the cellular communication radio network is considered to be an existing cellular communication network, such as GSM or equivalent. In order to be clearer to the one skilled in the art, description is given here using the usual vocabulary of the GSM protocol and, more particularly, of the Signaling System 7, SS7. However, this must not be construed as a limitation to this protocol or system, and the teaching of the invention of the present patent is transposable to any cellular communication network.

A measuring mobile terminal MMT is able to connect to said cellular communication network. For this purpose it comprises treatment and communication means adapted to said function. A measuring mobile terminal MMT typically comprises means for wireless communication and a SIM card recognised by said cellular communication network. Each SIM card is uniquely associated to an IMSI (International Mobile Subscriber Identity) number and it is not provided—at the moment of the purchase of the measuring mobile terminal MMT—of an associated MSISDN number (Mobile Station Integrated Services Digital Network Number), which can change in time.

The measuring mobile terminal MMT is permanently identified by a universal single identifier IMSI, associated to said SIM card.

According to prior art, a measuring mobile terminal MMT connects to a wireless cellular network by establishing a connection with a mobile switch center MSC/visitor location register VLR; both those entities are known to be grouped into a single physical entity. The selected MSC can be located anywhere in the network. The base station BSC is near the measuring mobile terminal MMT which controls a set of BTS.

In detail the base transceiver station, or BTS, contains the transceivers, antennas, and subsystems for encrypting and decrypting communications with the base station controller (BSC). Typically a BTS for anything other than a picocell will have several transceivers serving several different frequencies.

A BTS is controlled by a parent BSC that acts as a concentrator; in fact, a plurality of different low capacity connections to BTSs (with relatively low utilisation) become reduced to a smaller number of connections towards the mobile switching center (MSC) (with a high level of utilisation). Overall, this means that networks are often structured to have several BSCs distributed into the areas surrounding their BTSs which are in turn connected to large centralised MSC sites.

The link between the measuring mobile terminal MMT and the mobile switch center MSC/visitor location register VLR is typically and at least in part wireless, especially within the measuring mobile terminal MMT and a base transceiver station BTS to which the mobile switch center MSC/visitor location register VLR is connected. The links between the mobile switch center MSC/visitor location register VLR and the other elements of the cellular communication network or of the communication network are typically established by wire, using a known infrastructure of the cellular communication network today used.

According to prior art, such a connection between a measuring mobile terminal MMT and the cellular communication network is established once at the application running on the measuring mobile terminal MMT start. This connection then remains permanent during the whole measuring campaign, uselessly blocking resources of the cellular communication network.

Once connected to the cellular communication network, a measuring mobile terminal MMT can, according to its configuration, transmit to the machine to machine application M2MA either each measure or a plurality of measures collected, e.g. by means of a data message coding said measure or collection of measures. To do that, it uses a message protocol supported by the cellular communication network, such as SMS, USSD, or other equivalent. The message comprising said measure is transmitted through the network and directly addressed toward the machine to machine application M2MA or indirectly to a machine to machine application gateway M2MGW which then transmits it to the machine to machine application M2MA. In both cases, the destination address M2MA@ is known from the measuring mobile terminal MMT.

In return, the machine to machine application M2MA can address back a message to the measuring mobile terminal MMT; therefore it is necessary to be able to address said measuring mobile terminal MMT. The elements of the cellular communication network that are necessary to link a machine to machine application M2MA and a measuring mobile terminal MMT comprise at least the ones that follow.

A measuring mobile terminal MMT can connect through any of the mobile switch centers MSC/visitor location register VLR, initially unknown. Moreover, the measuring mobile terminal MMT can be mobile. This means that it can change from one mobile switch center MSC/visitor location register VLR to another, as a function of the cell nearest from its location or best signal reception. So, when a measuring mobile terminal MMT connects to the cellular communication network through a mobile switch center MSC/visitor location register VLR, or roams toward a new mobile switch center MSC/visitor location register VLR, said mobile switch center MSC/visitor location register VLR informs the cellular communication network of the new location of said measuring mobile terminal MMT. One element of the cellular communication network, named home location register HLR is in charge of maintaining said location up to date on a lookup table and keeps for each measuring mobile terminal MMT for which it is in charge, the last known location, in the form of an address MSC@ of the mobile switch center MSC/visitor location register VLR, through which said measuring mobile terminal MMT is connected to the network. Said home location register HLR is also a server, able to provide on demand, for a given measuring mobile terminal MMT, said address MSC@ from said table.

Whenever a network element wishes to send a message to a measuring mobile terminal MMT, it uses a short message service center SMSC. Said short message service center SMSC is a server able to retransmit said message to the measuring mobile terminal MMT. Said element then sends to said short message service center SMSC, said message along with an identifier allowing to uniquely identifying said measuring mobile terminal MMT. Said identifier is typically the public subscriber phone number MSISDN of the measuring mobile terminal MMT.

In order to locate the measuring mobile terminal MMT, the short message service center SMSC send a request to the home location register HLR indicating said public subscriber phone number MSISDN. The home location register HLR, answers back by indicating the mobile switch center MSC/visitor location register VLR address associated to the measuring mobile terminal MMT. It can be noted here that according to prior art, each measuring mobile terminal MMT is associated to a permanent public subscriber phone number MSISDN.

Given this location (MSC address) and identification (MSISDN) information, the short message service center SMSC is able to transmit the message to said mobile switch center MSC, comprising the MSISDN identifier. Said mobile switch center MSC/visitor location register VLR, thanks to the MSISDN identifier, can find and identify the measuring mobile terminal MMT and send to it said message.

Another element is an authentication center AuC. Such an element is able to authenticate a given measuring mobile terminal MMT. The authentication process occurs at the connection of the measuring mobile terminal MMT.

Another optional element can also be present in order to allow a machine to machine communication: a machine to machine gateway M2MGW able to interface between the cellular communication network and the machine to machine application M2MA. Such a machine to machine gateway M2MGW is e.g. useful when the machine to machine application M2MA is located is the communication network, but outside of the cellular communication network. In that case, said machine to machine gateway M2MGW acts as a gateway between the cellular communication network and its elements (HLR, MSC, SMSC, AuC, etc.) and the machine to machine application M2MA. So, if the machine to machine application M2MA is located over the internet network, the application gateway M2MGW comprises the means necessary to translate, to adapt the formats, to relay and redirect the data exchanges between the machine to machine application M2MA and any cellular communication network element, in both directions.

Figure 2:
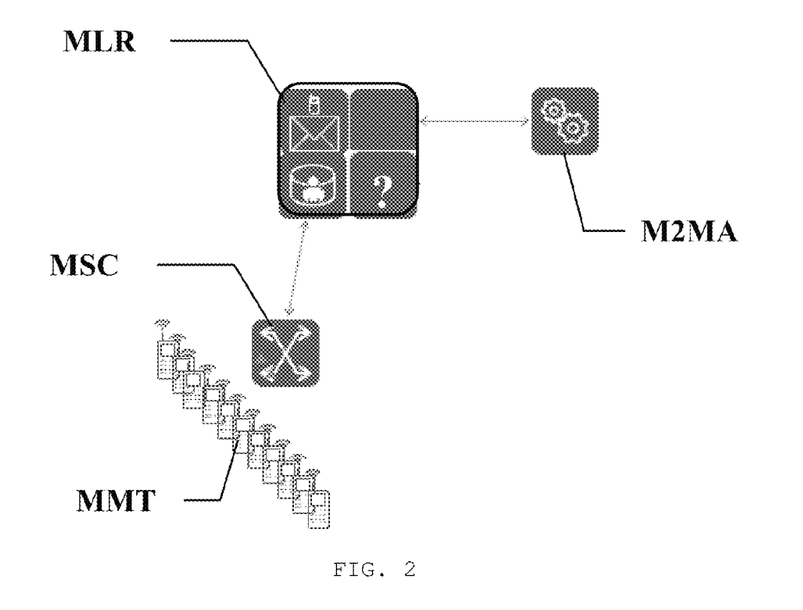
FIG. 2 shows a schematic view of a communication network according to the invention.

According to an important feature of the invention, illustrated in FIG. 2, in order to manage the measuring mobile terminals MMT of a machine to machine application M2MA, a single module, named MLR, is therefore created. The MLR which gathers the functions of at least these three/four elements: home location register HLR, short message service center SMSC, authentication center AuC and, when present, machine to machine application gateway M2MGW. The previous list of elements has to be intended as not exhaustive, in the sense that many other components can be included into the module MLR. It shall be noted that the traditional HLR is not embedded in the MLR. It still exists in the operator's network. The module MLR of the invention embeds a new home location register HLR that is dedicated for the MMT, but which keeps the functions of the traditional home location register HLR. Some modifications will be introduced in the HLR embedded in the MLR such as a function to manage the MSIDSN allocation for example.

This is obtained in the form of a new module MLR (Mobile Location Register), that replaces, for what concerns the measuring mobile terminals MMT, the three (or four) previously indicated elements HLR, SMSC, AuC and M2MGW into a same physical structure. It is therefore clear that all the functions previously supported by each of the previous elements HLR, SMSC, AuC and M2MGW, according to the present invention are now performed by the module MLR. Said module MLR is inserted in the cellular communication network by configuration of said network by replacing the addresses of the elements HLR, SMSC, AuC, M2MGW, by the address of module MLR, in translating address tables (e.g. Global Title tables in a Signaling System 7), for all the concerned measuring mobile terminals MMT. The concerned measuring mobile terminals MMT are here the measuring mobile terminals MMT related to a machine to machine application M2MA.

The cellular communication network still comprises some home location registers HLR, some short message service center SMSC, some authentication center AuC, that remain unaffected, in order to manage the other mobile terminals, not related to a machine to machine application, such as mobile phones.

Such a gathering of said three (or four) elements in one single module MLR implies, according to the invention, that these elements belong to a same software executing over one single physical data processing unit or computer. Such a gathering is advantageous because it simplifies, shortens or even avoids some data exchanges between elements described in the prior art. This advantageously allows a simplification of installation, maintenance, management of entities related to a machine to machine application M2MA. So, e.g., the creation or the correction of a measuring mobile terminal MMT profile can be done using only one single entity, the module MLR, which can then manages a single database BDD for all the associated measuring mobile terminals MMT. As well all the HLR, SMSC, AuC, M2MGW subsystems can be adapted to a specific exigency of a user even if maintaining their traditional function.

According to the invention, the short message service center SMSC can be a service center for message of any type, available in the cellular communication network. It can thus be a message service center for SMS type messages, or else a message service center for USSD type messages, or any other equivalent message service center. According to an embodiment, module MLR of the invention includes functions of a single message service center among all possible ones. Alternately module MLR of the invention includes functions of several message service centers, so as to allow sending of different types of message.

The invention also concerns a method, introducing several features in order to optimize the communication network resources use and particularly to drastically reduce the number of public subscriber phone numbers MSISDN needed to manage and to address a great number of measuring mobile terminals MMT.

According to prior art, a connection between a measuring mobile terminal MMT and the cellular communication network is established once at application start. On the contrary, the method according to the invention plans a connection for each sending of a measure or collection of measures. By doing so, in a typical measuring application, such as a telemetry application, a measuring mobile terminal MMT performs one measure, once per period, e.g. once per hour, and send said measure through the communication network. The sending of a message comprising the measure only takes a few seconds. It is then useless to maintain a stable or static connection to the communication network which needlessly network resources when data have been sent.

A method according to the invention thus advantageously comprises, to link a machine to machine application M2MA with at least one measuring mobile terminal MMT, the followings steps. The measuring mobile terminal MMT, after the measure or the collection of measures have been collected and are ready to be sent, connects to the cellular communication network, and in detail by means of a base transceiver station BTS in turn connected as known with a base station controller BSC, to mobile switch center MSC/visitor location register VLR, typically the one which is closer to the measuring mobile terminal MMT or provides better radio signal conditions. The mobile switch center MSC/visitor location register VLR remains unaltered. Once the connection is established, the measuring mobile terminal sends said measure or collection of measures, through the communication network, towards the machine to machine application M2MA. The communication network carries the message towards its destination. Once said sending is done, and advantageously if the next measure or a plurality of measures is delayed in time, the measuring mobile terminal MMT frees the network resources by disconnecting from the communication network, until the next scheduled new measure or a plurality of measures. The disconnection therefore frees the radio channel previously occupied for measured data transmission also from network control data exchanged to/from the measuring mobile terminal MMT.

In current machine to machine environments, a measure is typically sent as soon as possible. Most often, the measuring mobile terminals MMT are not configured or are configured by default when it comes to the time of measure acquisition, the time of measure sending or the time of connecting to the network. Therefore, according to the present invention, it is possible to arrange a predetermined and modifiable data exchange timetable. A measure can then be collected at an undefined time or at a predetermined time common to all the measuring mobile terminals MMT. It can follow from such an arrangement that all the measures, collected according to e.g. a one hour period, are collected either by default or by configuration at the same time, e.g. the round hour. It then follows a simultaneous sending from all measuring mobile terminals MMT, which may be numerous, of measuring messages, potentially leading to an overflow of the cellular communication network. This is as much prejudicial as no other message is sent during the remainder of the period/hour.

According to an advantageous feature of the method, either the sending time of a measure, or preferentially the connection time of a measuring mobile terminal MMT can be configured. So, especially when the data inherent to a measure are long and do not need to be updated very often, it is possible to define the time at which the measuring mobile terminal MMT connects and thus the time when the measure is sent. This may imply a delay between the measurement time and the sending time of the measure. The measurement time can be let unchanged or can be independently configured. Some measuring mobile terminals MMT may then connects and sends their measure e.g. at the round hour more 5 min, others e.g. at the round hour more 10 min, and so on by spreading the sending over the period. By doing so, the transmitting load of the cellular communication network can be shared in time in order to avoid the overflow by spreading it over time. Such a configuration of measuring mobile terminals MMT can be defined in a measuring mobile terminal profile stored in a database maintained by module MLR or can be defined on a message basis, e.g. when the machine to machine application M2MA sends a message or a response. Therefore this feature allows to a time division on multiple access (TDMA) of the meaning mobile terminals (MMT).

It has been previously seen that, according to prior art, a mobile terminal is addressed, in a cellular communication network, e.g. for sending to it a message, by a public subscriber phone number MSISDN. Such numbers are available but in limited quantities. In the case of a measuring mobile terminal MMT, associated to a machine to machine application M2MA, the current invention exhibits several methods to avoid an allocation of a permanent public subscriber phone number MSISDN to each measuring mobile terminal MMT.

According to a first embodiment, capable of reducing the size of the naming space, a public subscriber phone number MSISDN is allocated only temporarily to a measuring mobile terminal MMT and therefore to the corresponding associated SIM card, for a duration limited to its actual connection to the cellular communication network reuse some public subscriber phone numbers MSISDN, from a measuring mobile terminal MMT to another one, which are not simultaneously connected to the network. At a given time, a public subscriber phone number MSISDN is uniquely allocated to at most one measuring mobile terminal MMT. The allocation management is performed by the module MLR.

The allocation of a public subscriber phone number MSISDN to a measuring mobile terminal MMT can be done systematically during each connection to the network, since it is a temporary allocation.

According to an alternate embodiment, allowing to further drastically reduce the naming space, each measuring mobile terminal MMT, associated to a given machine to machine application M2MA, is allocated by means of a private device identifier PDID. Said private device identifier PDID is not a public identifier and is not a public subscriber phone number MSISDN. Said private device identifier PDID is a private identifier in that it is managed by the module MLR. So, the module MLR permanently maintains the database BDD updated, and therefore updates the look-up table associating for each measuring mobile terminal MMT, its universal single identifier IMSI and its private device identifier PDID. Said private device identifier PDID is defined only in the perimeter of the machine to machine application M2MA and is used inside this perimeter to identify a measuring mobile terminal MMT, e.g. to send a message to it from a machine to machine application M2MA. This use is more deeply detailed with reference to flow diagrams of FIGS. 3-8.

At a given time, a private device identifier PDID is uniquely allocated to at most one measuring mobile terminal MMT. Such an allocation of a private device identifier PDID can be permanent for a given measuring mobile terminal MMT. By doing so, this private device identifier PDID is left unchanged from a connection/disconnection of said measuring mobile terminal MMT to/from the cellular communication network. The measuring mobile terminal MMT keeps its private device identifier PDID, even when it is disconnected and unseen from the communication network. This necessitates a naming space of which size is equal to the number of measuring mobile terminals MMT in said perimeter.

The allocation of a private device identifier PDID to a measuring mobile terminal MMT can be done e.g. during its first connection to the network, since it is a permanent allocation. Alternately a private device identifier PDID can be allocated to a measuring mobile terminal MMT in a global configuration step, e.g. by mean of a database or look up table e.g. managed by the module MLR and comprising for each measuring mobile terminal MMT, its universal single identifier IMSI and its private device identifier PDID.

The private device identifier PDID can be formed by the association of an identifier of the subscription and an identifier of the measuring mobile terminal MMT. The subscription identifier identifies or describes the owner and its attachment policy and charging rules. The MMT identifier uniquely identifies the measuring mobile terminal MMT in the subscription.

Such a private device identifier PDID will simplify access of subscription information. The group management will also be simplified because all MMT that belong to the same group will have the same subscription identifier.

Private device identifier PDID is also useful in case of a MMT SIM card which embeds multiple universal single identifiers IMSI. Multiple IMSI feature is used when a MMT is roaming in different networks and for charging optimization purpose, the matching IMSI with the network identifier (mobile country code MCC and mobile network code MNC) will be sent by the SIM card when the MMT wants to connect in a network. In case of multiples networks managed by a single telecom group (for example), it can be an advantage for this telecom group to have a unique identifier that identifies the SIM card uniquely. The MLR is able to provide this unique identifier by using the PDID.

Now, we are going to describe, with reference to FIGS. 3-8, the embodiments of the invention, comparatively to prior art, for three operations: a connection of a measuring mobile terminal MMT to the network, the sending of a message FROM a measuring mobile terminal MMT, and the sending of a message TOWARD a measuring mobile terminal MMT.

Figure 3:
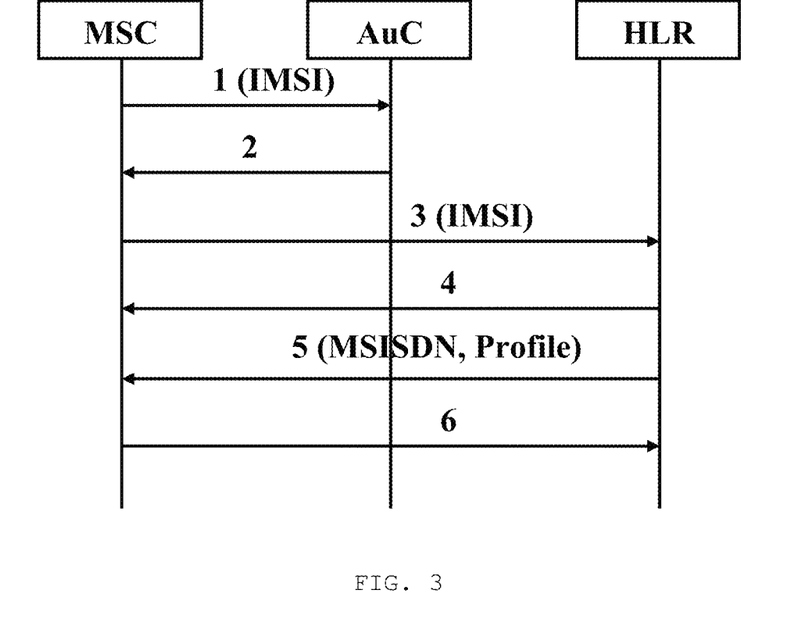
FIG. 3 shows a flow diagram of exchanges between elements, during the connection of a terminal, according to prior art.
Figure 4:
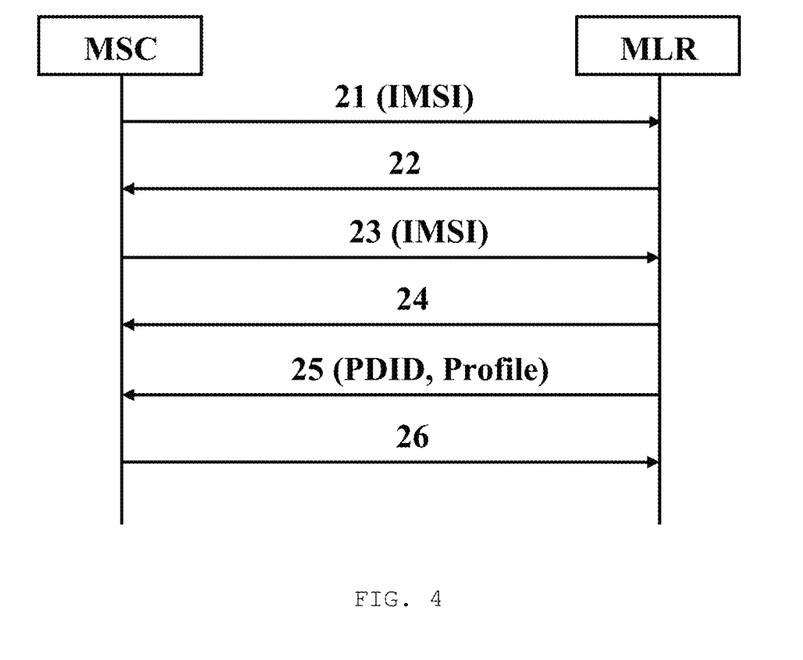
FIG. 4 shows a flow diagram of exchanges between the elements, during the connection of a terminal, according to the invention.

FIG. 3 shows a flow diagram corresponding to a connection according to prior art, while FIG. 4 shows a flow diagram corresponding to a connection according to the invention.

With reference to FIG. 3, according to prior art, following the connection of a measuring mobile terminal MMT with a mobile switch center MSC/visitor location register VLR, said mobile switch center MSC/visitor location register VLR knows the universal single identifier IMSI of the measuring mobile terminal MMT. It then sends an authentication request 1 of the measuring mobile terminal MMT based on said universal single identifier IMSI. Said request 1 is sent to a network element AuC in charge of authentication. This is done in Signaling System 7 by a MAP-Send-Authentication-Info communication 1 with the universal single identifier IMSI as a parameter. Said authentication element AuC answers to the mobile switch center MSC/visitor location register VLR with a communication 2 with some identification information as parameter. In Signaling System 7 this is done by a MAP-Send-Authentication-Info-response communication 2.

The mobile switch center MSC then informs 3 the home location register HLR of the new location (and of the apparition in the cellular communication network) of the measuring mobile terminal MMT, still identified by its universal single identifier IMSI. This is done in Signaling System 7 by a MAP-Update-Location communication 3 with the universal single identifier IMSI as parameter. Then the home location register HLR provides 4 to the mobile switch center MSC/visitor location register VLR some information concerning the measuring mobile terminal MMT. Said information comprise the public subscriber phone number MSISDN of the measuring mobile terminal MMT, and other profile parameters. This is done in Signaling System 7 by a MAP-Insert-Subscriber-Data communication 4 with the public subscriber phone number MSISDN of the measuring mobile terminal MMT and other profile data as parameters. The mobile switch center MSC/visitor location register VLR acknowledges receipt and sends back to the home location register HLR a receipt acknowledgment 5. This is done in Signaling System 7 by a MAP-Insert-Subscriber-Data-response communication 5. The home location register HLR acknowledges receipt and sends back in return to the mobile switch center MSC a communication 6. This is done, in Signaling System 7, by a MAP-Update-Location-response communication 6.

With reference to FIG. 4, according to the invention, following the connection of a measuring mobile terminal MMT with a mobile switch center MSC/visitor location register VLR, said mobile switch center MSC knows the universal single identifier IMSI of the measuring mobile terminal MMT. It then sends an authentication request 21 of the measuring mobile terminal MMT based on said universal single identifier IMSI. Said request 21 is sent to the network element in charge of authentication, that is, to the module MLR, since said module MLR acts according to the invention, for the measuring mobile terminals MMT, as the former authentication module AuC. This is done in Signaling System 7 by a MAP-Send-Authentication-Info communication 21 with the universal single identifier IMSI as parameter. Said module MLR answers to the mobile switch center MSC by a communication 22 with identification information as parameter. In Signaling System 7 this is done by a MAP-Send-Authentication-Info-response communication 22. With respect to authentication, the module MLR acts exactly the same as the former AuC module.

The mobile switch center MSC then informs 23 the module MLR, that replaces according to the invention the prior art home location register HLR for the management of the location of measuring mobile terminals MMT, of the new location (and of the appearance in the cellular communication network) of the measuring mobile terminal MMT, still identified by its universal single identifier IMSI. This is done in Signaling System 7 by a MAP-Update-Location communication 23 with the universal single identifier IMSI as parameter. Then the module MLR provides 24 to the mobile switch center MSC some information concerning the measuring mobile terminal MMT. Said information comprise, depending on the embodiment, either the temporary public subscriber phone number MSISDN of the measuring mobile terminal MMT, and other profile parameters. This is done in Signaling System 7 by a MAP-Insert-Subscriber-Data 24 communication with the public subscriber phone number MSISDN, respectively the private device identifier PDID, of the measuring mobile terminal MMT and other profile data as parameters. The mobile switch center MSC/visitor location register VLR acknowledges receipt and sends back to the module MLR a receipt acknowledgment 25. This is done in Signaling System 7 by a MAP-Insert-Subscriber-Data-response 25 communication.

The module MLR acknowledges receipt and sends back to the mobile switch center MSC a receipt acknowledgement 26. This is done, in Signaling System 7, by a MAP-Update-Location-response communication 26.

Figure 5:
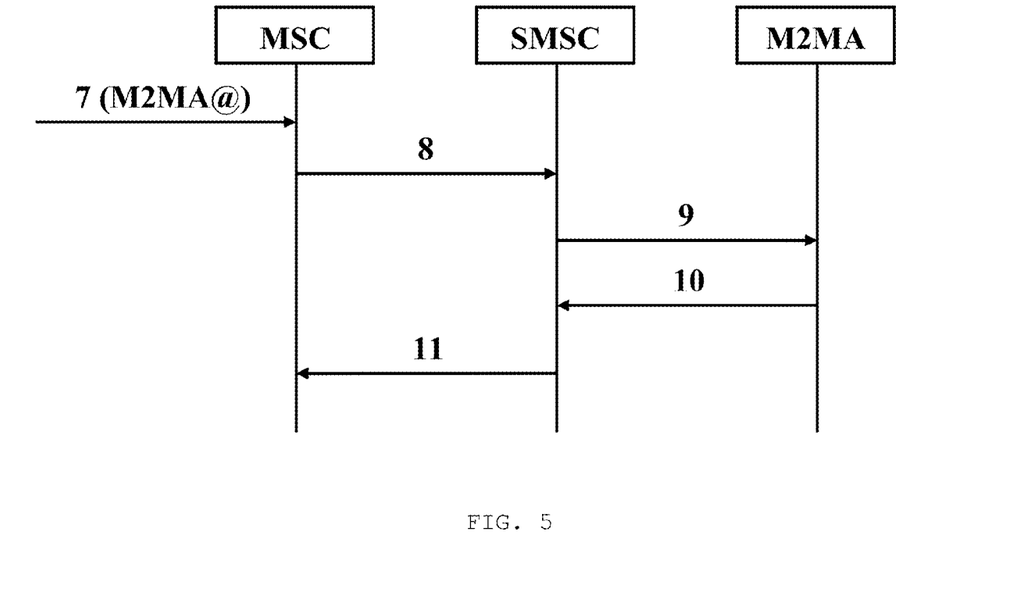
FIG. 5 shows a flow diagram of exchanges between the elements, during the sending of a message FROM a terminal, according to prior art.
Figure 6:
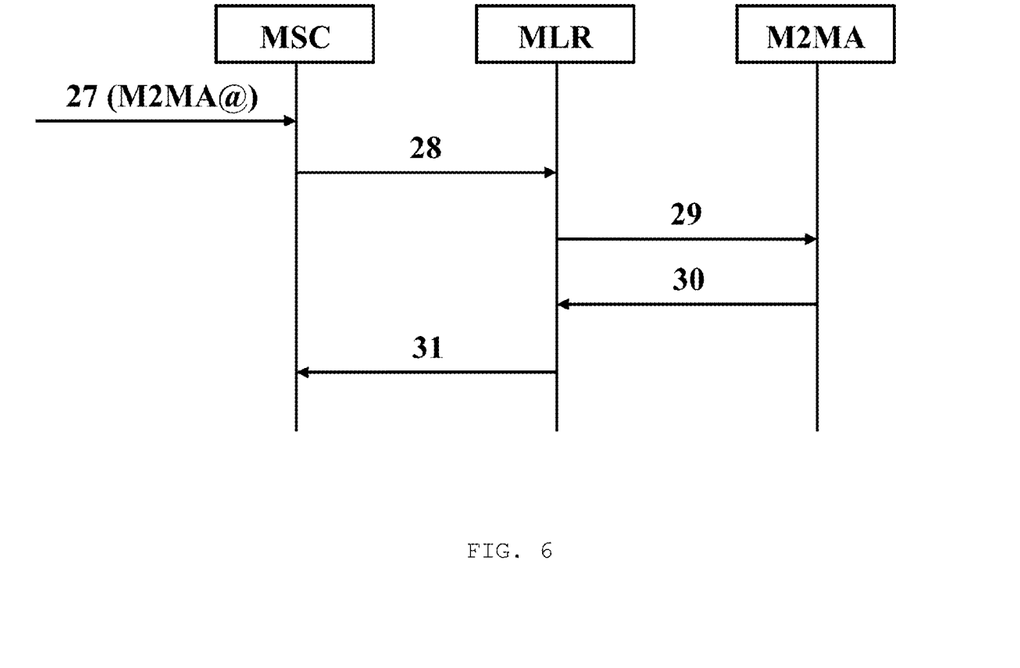
FIG. 6 shows a flow diagram of exchanges between the elements, during the sending of a message FROM a terminal, according to the invention.

FIG. 5 shows a flow diagram corresponding to the sending of a message from a measuring mobile terminal MMT, according to prior art, while FIG. 6 shows a flow diagram corresponding to the sending of a message from a measuring mobile terminal MMT, according to the invention.

With reference to FIG. 5, according to prior art, a mobile switch center MSC/visitor location register VLR receives from a measuring mobile terminal MMT a message to be retransmitted, to a machine to machine application M2MA by mean of a communication 7. In a machine to machine environment, such a message typically comprises at least one measure and is to be sent to a machine to machine application M2MA in charge of the gathering and treatment of the measures. The communication 7 comprises an address M2MA@ as parameter allowing finding of the machine to machine application M2MA or equivalently the short message service center SMSC. The mobile switch center MSC transmits said message to said short message service center SMSC in a communication 8. This is done in Signaling System 7 by a MAP-Forward-SM communication 8. The short message service center SMSC then in turn acknowledges receipt 9 to the mobile switch center MSC/visitor location register VLR. This is done in Signaling System 7 by a MAP-MO-forward-SM-response 9.

The short message service center SMSC translates or eventually adapts the message and transmits 10 it to the machine to machine application M2MA. This is done using e.g. the short message peer to peer protocol SMPP, by a Deliver-SM communication 10. In return, the machine to machine application M2MA acknowledges receipt 11 to the short message service center SMSC. This is done in SMPP by a Deliver-SM-response 11.

The public subscriber phone number MSISDN provided by the home location register HLR during the connection step, is here used to identify/sign the sender of the message, that is, the measuring mobile terminal MMT.

With reference to FIG. 6, according to the invention, a mobile switch center MSC receives from a measuring mobile terminal MMT a message to transmit, to a machine to machine application M2MA by mean of a communication 27. In a machine to machine environment, such a message typically comprises at least one measure and is to be sent to a machine to machine application M2MA in charge of the gathering and treatment of the measures. The communication 27 comprises an address M2MA@ as parameter allowing finding the machine to machine application M2MA or equivalently the module MLR which replaces here the short message service center SMSC. The mobile switch center MSC transmits said message to said module MLR in a communication 28. This is done in Signaling System 7 by a MAP-Forward-SM communication 28.

The module MLR then in turn acknowledges receipt 29 to the mobile switch center MSC. This is done in Signaling System 7 by a MAP-MO-Forward-SM-response 29.

The module MLR translates or eventually adapts the message and transmits 30 it to the machine to machine application M2MA. This is done in SMPP, by a Deliver-SM communication 30. In return, the machine to machine application M2MA acknowledges receipt 31 to the module MLR. This is done in SMPP by a Deliver-SM-response 31.

A measuring mobile terminal MMT knows by configuration the destination address M2MA@ allowing it to send a message to the machine to machine application M2MA to which it is attached.

According to the previously described embodiments, a measuring mobile terminal MMT may be identified either by a temporary public subscriber phone number MSISDN, or by a private device identifier PDID. Either said temporary public subscriber phone number MSISDN or said private device identifier PDID are provided by the module MLR during the connection step, and is used here to identify/sign the sender as the originator of the message, that is, the measuring mobile terminal MMT.

Figure 7:
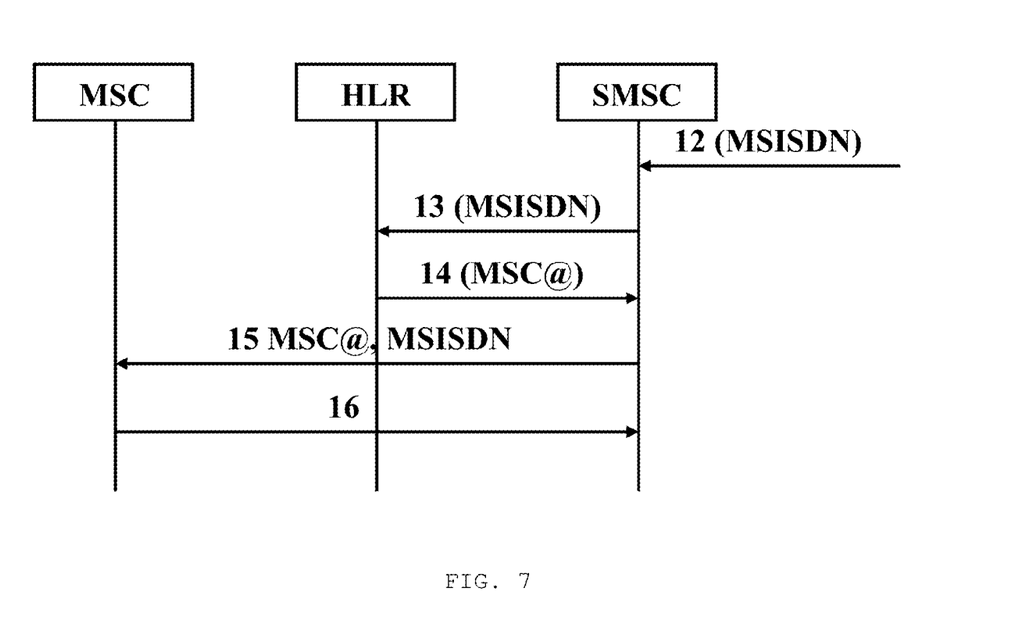
FIG. 7 shows a flow diagram of exchanges between the elements, during the sending of a message TO a terminal, according to prior art.
Figure 8:
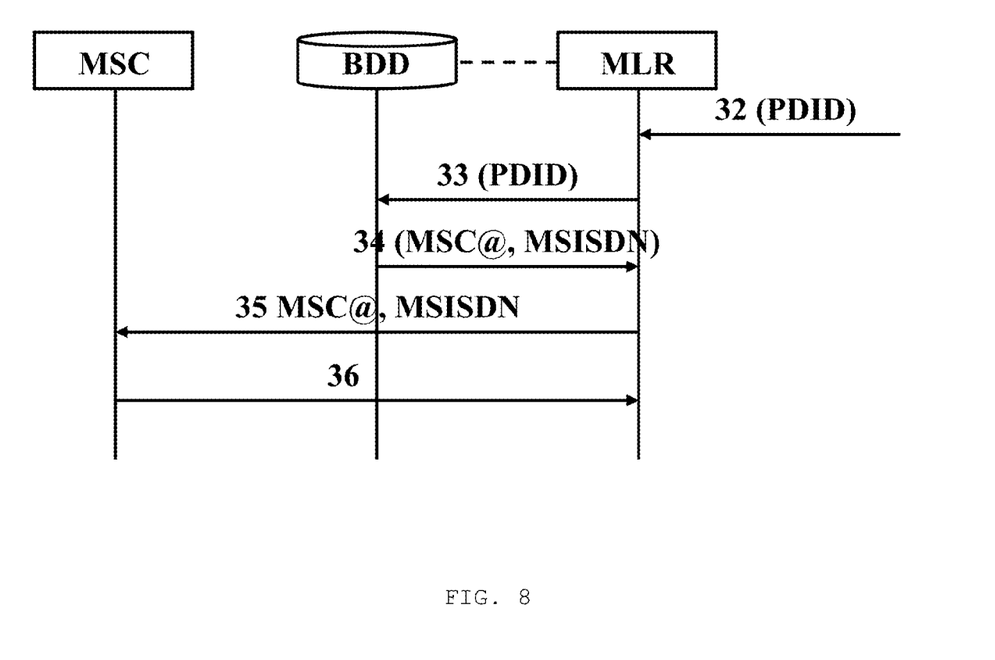
FIG. 8 shows a flow diagram of exchanges between the elements, during the sending of a message TO a terminal, according to the invention.

FIG. 7 shows the flow diagram corresponding to the sending of a message toward a measuring mobile terminal MMT, according to prior art, while FIG. 8 shows the flow diagram corresponding to the sending of a message toward a measuring mobile terminal MMT, according to the invention.

With reference to FIG. 7, according to prior art, a message to a measuring module terminal MMT is sent by its sender to the short message service center SMSC by means of a communication 12. In a machine to machine environment said sender is typically a machine to machine application M2MA. Such a machine to machine application M2MA typically uses such a message to configure a measuring mobile terminal MMT by transmitting to it an order figuring, e.g. which measure to do, according to which period, etc. The targeted measuring mobile terminal MMT is identified for the short message service center SMSC, classically, by its public subscriber phone number MSISDN. Said public subscriber phone number MSISDN is transmitted as a parameter in the communication 12. This is done in Signaling System 7 by a Send-Msg communication 12 with the public subscriber phone number MSISDN as parameter. Said short message service center SMSC locates the measuring mobile terminal MMT by mean of a request 13 to the home location register HLR. In said request 13, the targeted measuring mobile terminal MMT is identified for said home location register HLR, classically, by its public subscriber phone number MSISDN. This is done in Signaling System 7 by a MAP-SRI-SM communication 13 with the public subscriber phone number MSISDN as parameter. The Home Location Register HLR answers by a communication 14. An address MSC@ of the mobile switch center MSC/visitor location register VLR managing the measuring mobile terminal MMT is returned back as parameter of said communication 14. This is done in Signaling System 7 by a MAP-SRI-SM-response communication 14 with the address MSC@ of the mobile switch center MSC/visitor location register VLR as parameter. Given said address MSC@, the short message service center SMSC can transmit the message by mean of a communication 15 addressed to said mobile switch center MSC/visitor location register VLR. This is done in Signaling System 7 by a MAP-MT-Forward-SM communication 15 with the public subscriber phone number MSISDN as parameter. So, the mobile switch center MSC/visitor location register VLR receives the message, identifies the measuring mobile terminal MMT destination by mean of its public subscriber phone number MSISDN and can then transmit to it said message. The mobile switch center MSC acknowledges receipt to the short message service center SMSC by a receipt acknowledgement 16. This is done in Signaling System 7 by a MAP-MT-Forward-SM-Response communication 16.

With reference to FIG. 8, according to the invention, a message to a measuring module terminal MMT is sent by its sender to the module MLR, here replacing a short message service center SMSC, by mean of a communication 32. The targeted measuring mobile terminal MMT is identified for said module MLR, according to the invention, by its private device identifier PDID. Said private device identifier PDID is transmitted as a parameter of communication 32. This is done in SMPP by a Submit-SM communication 32 with the private device identifier PDID as parameter. Said module MLR searches for the universal single identifier IMSI allocated to the measuring mobile terminal MMT by mean of a request 33 to a database BDD internal to the module MLR. In said request 33, the concerned measuring mobile terminal MMT is identified, according to the invention, by its private device identifier PDID. Alternately, in said request 33, the concerned measuring mobile terminal MMT may be identified by its universal single identifier IMSI, depending on the database organisation. Said database BDD permanently maintains up to date the location of the measuring mobile terminals MMT in function of the location communications 23 sent by the mobile switch centers MSC/visitor location register VLR to the module MLR. In said database BDD, each measuring mobile terminal MMT is identified by its universal single identifier IMSI and/or its private device identifier PDID, and its location is stored by the address MSC@ of the mobile switch center MSC through which the measuring mobile terminal MMT is connected to the communication network. The database BDD permanently maintains, for each measuring mobile terminal MMT, a look up table between its universal single identifier IMSI and its private device identifier PDID. The database BDD may be requested to provide a universal single identifier IMSI in function of a private device identifier PDID, or reciprocally, a private device identifier PDID in function of a universal single identifier IMSI. The database BDD answers back by a communication 34. The address MSC@ of the mobile switch center MSC/visitor location register VLR managing the measuring mobile terminal MMT and the IMSI associated to the measuring mobile terminal MMT are returned back as parameters of said communication 34. Given said address MSC@, the module MLR can transmit the message by mean of a communication 35 addressed to said mobile switch center MSC. This is done in Signaling System 7 by a MAP-MT-Forward-SM communication 35 with said IMSI as parameter. So, the mobile switch center MSC receives the message, identifies the measuring mobile terminal MMT destination by mean of its universal single identifier IMSI and can then transmit to it said message. The mobile switch center MSC acknowledges receipt to the module MLR by a receipt acknowledgement 36. This is done in Signaling System 7 by a MAP-MT-Forward-SM-Response communication 36.

The module MLR thus constitutes a comprehensive module also capable of keeping the correspondence between the private device identifier PDID of the measuring mobile terminal MMT, its IMSI and the temporary MSISDN while the terminal is connected to the cellular network.

Figure 9:
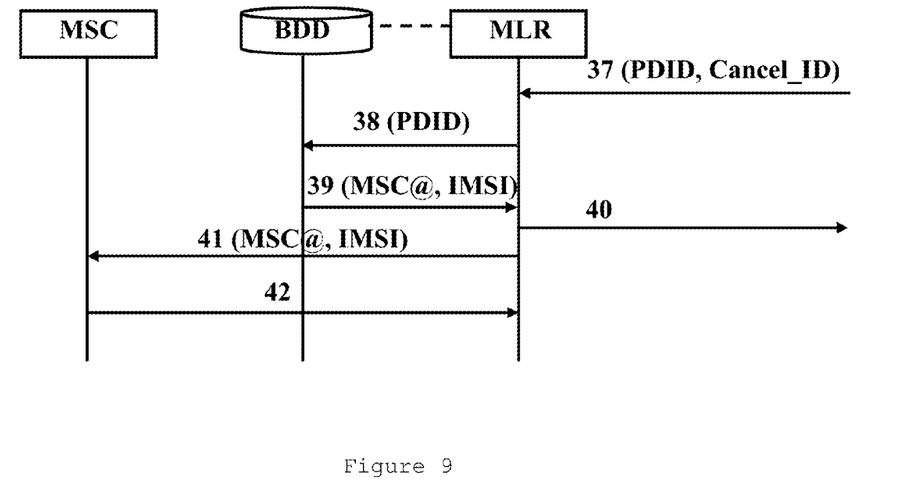
FIG. 9 shows a flow diagram of exchanges between the elements, during the disconnection of mobile measuring terminal MMT, according to an embodiment of the invention.

With reference to FIG. 9, according to the invention, disconnection of the measuring mobile terminal MMT can be done by the MLR on reception of a message or by its own decision. As the MLR advantageously embed such element as the SMSC, the M2MGW, and the HLR (with the BDD), the M2M, typically through a software application that it embeds, can signal the end of the data reception from a measuring mobile terminal MMT, the MMT being identified for the module MLR by its private device identifier PDID. Said private device identifier PDID is transmitted by the M2MA to the MLR as a parameter of communication 37. This may for instance be done in SMPP by a Cancel-SM communication 37 with the private device identifier PDID and a special message identifier set to a predefined value as parameter. The invention encompasses alternative solutions where the disconnection may be requested through a web service (using the SOAP protocol for instance) or through a proprietary interface. If the message identifier is recognized as an existing message in the SMSC then the message is processed normally by the SMSC function. If the message identifier is equal to a predefined value (e.g., Cancel_ID) then the MLR module knows that it must take special action to disconnect the MMT. Then, the module MLR searches for the universal single identifier IMSI allocated to the measuring mobile terminal MMT by mean of a request 38 to a database BDD internal to the module MLR. In said request 38, the concerned measuring mobile terminal MMT is identified, according to the invention, by its private device identifier PDID. Alternately, in said request 38, the concerned measuring mobile terminal MMT may be identified by its universal single identifier IMSI, depending on the database organization. Said database BDD permanently maintains up to date the location of the measuring mobile terminals MMT in function of the location communications sent by the mobile switch centers MSC/visitor location register VLR to the module MLR. In said database BDD, each measuring mobile terminal MMT is identified by its universal single identifier IMSI and/or its private device identifier PDID, and its location is stored by the address MSC@ of the mobile switch center MSC through which the measuring mobile terminal MMT is connected to the communication network. The database BDD permanently maintains, for each measuring mobile terminal MMT, a look up table between its universal single identifier IMSI and its private device identifier PDID. The database BDD may be requested to provide a universal single identifier IMSI in function of a private device identifier PDID, or reciprocally, a private device identifier PDID in function of a universal single identifier IMSI. The database BDD answers back by a communication 39. The SMPP Cancel-SM can be answered by a message 40 SMPP Cancel-SM-RESP in acknowledgment of message 37.

The address MSC@ of the mobile switch center MSC/visitor location register VLR managing the measuring mobile terminal MMT and the IMSI associated to the measuring mobile terminal MMT are therefore retrieved by BDD and are sent to the MLR as parameters of said communication 39. Given said address MSC@, the module MLR can transmit the disconnection message by mean of a communication 41 addressed to said mobile switch center MSC. This is done in Signaling System 7 by a MAP-Cancel-Location communication 41 with said IMSI as parameter. So, the mobile switch center MSC receives the message, identifies the measuring mobile terminal MMT destination by mean of its universal single identifier IMSI and can then transmit to it said message. The mobile switch center MSC acknowledges receipt to the module MLR by a receipt acknowledgement 42. This is done in Signaling System 7 by a MAP-Cancel-Location-Result communication 42.

According to a preferred but non limitative embodiment, the disconnection process described above in reference to FIG. 9 is initiated by the M2MA upon occurrence of an event. For instance, said event is the reception of a data from the MMT. In that case, the disconnection process is executed upon completion of the sending of a message from a measuring module terminal MMT to a M2MA as described with reference to FIG. 8. Said event can also be a predetermined time and date or a predetermined time duration after the M2MA has sent a message to the MMT or a predetermined time duration after the M2MA has received a message from the MMT.

Thus, the MLR allows an easy and efficient handling of the disconnections of the MMT. MMT can therefore be disconnected from the network once its data are transmitted to the M2MA. The resources of the network can thus be released when the MMT does not send any data, enhancing thereby the efficiency of the network.

Another problem occurring in a machine to machine environment is the billing of the communications. A cellular communication network classically uses a billing paradigm where a call data record CDR (also called event data record) is built on the basis of a single call. Contrarily to a phone call, transmitting a large data volume over a medium of long duration, continuously and singularly, a measuring mobile terminal MMT typically transmits a small data volume, e.g. a single measure, over a very short duration, but repeats periodically the sending operation over a maybe very high plurality of times. The use of such a call and/or duration based paradigm, would lead, if applied to a machine to machine environment, to building and sending of too many call data records CDR, each corresponding to a very small billing volume, thus leading to a billing management inefficiency that furthermore increases with the number of measuring mobile terminals MMTs actually operating. For this reason a call and/or duration based billing paradigm appears to be inadequate to a machine to machine environment.

In order to solve this problem, the method according to the invention proposes to not send a call data record CDR for each message sent or received. On the contrary, according to the invention, the exchanged messages are advantageously gathered/grouped and a single call data record CDR is built and sent for said group. This can be done e.g. by the module MLR which benefits from a central vision of the machine to machine environment.

The module responsible for these charging management and CDR generation is called charging mediation optimizer (CMO). Advantageously the CMO module embeds an accounting database (ADB) that is in charge of storing every single charging operation relative to the message from the MMT and processed by the MLR. Alternatively, the ADB is not embedded in the CMO but is still connected to the CMO.

Figure 10:
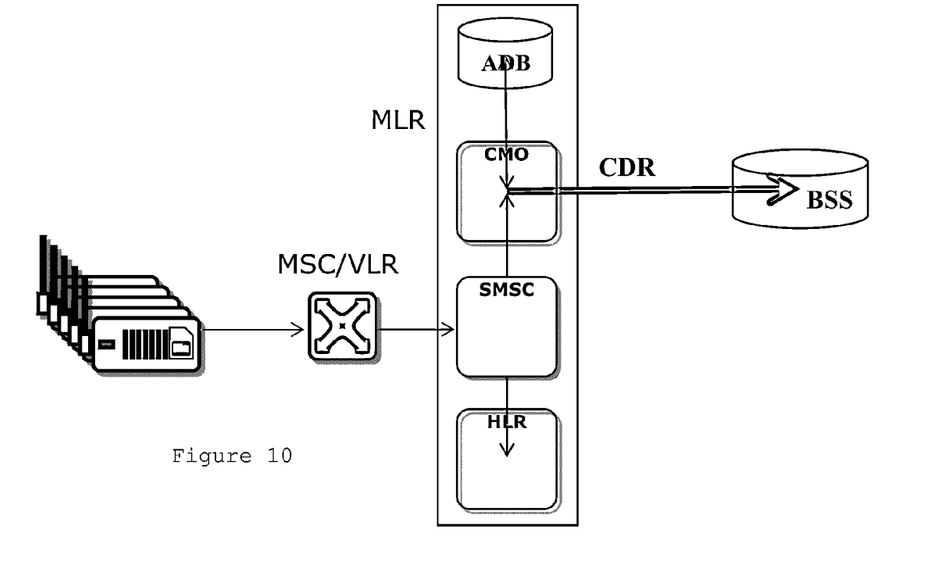
FIG. 10 shows a schematic view of a module MLR according to an embodiment of the invention, wherein the module MLR embeds elements in charge of charging functions.

FIG. 10 shows a module MLR that embeds the function in charge of the gathering of the charging operations. According to this advantageous embodiment, the charging mediation optimizer (CMO) is embedded in the module MLR. Preferably, the ADB is also embedded in the module MLR. The MLR is configured to communicate with a billing system (BSS) of the network. Advantageously, the BSS is a conventional BSS.

The gathering of single records stored in the ADB can be scheduled in order to be performed at predetermined time intervals. In that case, the messages sent and/or received by a measuring mobile terminal MMT are grouped over a given configurable duration of time. It is also possible to condition the sending of a call data record CDR to a given volume of transmitted messages or equivalently to a given billing amount.

The gathering of the single record stored in the ADB can also be done spatially. In that case the messages sent and/or received by a set of measuring mobile terminals MMT, said set being configurable, are grouped. It is thus possible to gather in a same single call data record CDR, e.g. all the charging information relatives to a set of measuring mobiles terminals (MMT) associated for instance to a same machine to machine application M2MA or relatives to a same subscriber of a machine to machine application M2MA.

It is also possible to combine the spatial and the temporal gathering approaches.

All these approaches aim at decreasing the number of call data records CDR sent up to a reasonable number.

Figure 11:
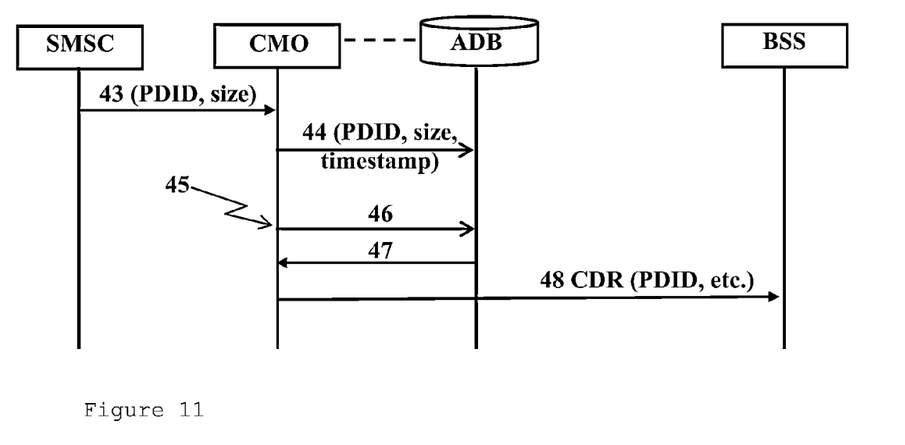
FIG. 11 shows a flow diagram of exchanges between the elements, during the creation by the module MLR of a call data record to be sent to a billing system.

With reference to FIG. 11, a message 43 is sent between a SMSC and CMO. Typically, the message 43 is sent when a MMT sends toward a M2MA a message to containing measurement data. The message 43 provides the CMO with the PDID of the MMT sending the message and the data size of the message. The CMO generates a record 44 which contains the PDID, the message size and the timestamp of the message reception. Record 44 is stored in the accounting database ADB.

When a predetermined event 45 occurs, for instance at a predetermined time/date or when a predetermined time interval lapses or upon instructions received from the BSS, the CMO reads the ADB database 46 in order to get 47 all charging information relative to a MMT (through its PDID) or relative to a set of MMT. The charging mediation optimizer CMO then consolidates all the charging information retrieved from the ADB in order to create a CDR. As discussed above, the charging mediation optimizer CMO may retrieve from the ADB database and may aggregate in a same CDR charging information either related to a single MMT or related to a set of MMTs.

Then the MLR transmits 48 the CDR to the BSS. Preferably, the charging mediation optimizer CMO is in charge of sending the CDR to the BSS.

The CDR comprises attributes that characterize the charging operation and that are required by the BSS to process the CDR. The CDR transmitted by the MLR to the BSS typically comprises: the PDID of the MMT, the volume of data transmitted by the MMT. In case, the CDR gathers charging operations executed by a group of MMTs, then the CDR may comprise the PDID of all the MMTs of said group and the total volume of data sent by all MMTs of said group.

Alternately and according to a preferred embodiment, the CDR comprises an identifier of the subscriber using the group of MMTs. As described above with reference to a non limitative embodiment, the private device identifier PDID can be formed by the association of an identifier of the subscription and an identifier of the measuring mobile terminal MMT. The subscription identifier identifies or describes the owner and its attachment policy and charging rules. The MMT identifier uniquely identifies the measuring mobile terminal MMT in the subscription. Thus, all MMTs that belong to the same group will have the same subscription identifier. Therefore, the CDR can comprise the identifier of the group of MMTs.

Alternately, the CDR comprises the volume of data of each MMTs of said group.

Preferably and optionally, the attributes that characterize the charging event and that are comprised in the CDR also comprise the time and date of the message sent by the MMT. Indeed, information regarding the time and date of the message can impact the computation of the charging and billing that will be executed by the BSS. Preferably, the time and date is stored as a timestamp generated by the CMO as described above and depicted on FIG. 11. This allows reducing the volume of data transmitted between the MMT and the SMSC and between the SMSC and the CMO. Alternately, the information regarding the time and date of the message is created by the MMT or by the SMSC.

While there is shown and described the present preferred embodiment of the invention, it is to be distinctly understood that this invention is not limited thereto but may be variously embodied to practice within the scope of the following claims.

The invention claimed is:

1. A non-transitory module (MLR) connected through a cellular communication network to at least a measuring mobile terminal (MMT), at least a mobile switch center (MSC)/visitor location register (VLR) and at least a machine to machine application (M2MA), wherein the module (MLR) comprises:
   one of the group consisting of i) a database (BDD) and ii) a connection to a database (BDD), wherein the database (BDD) stores for each measuring mobile terminal (MMT): a universal single identifier (IMSI), a private device identifier (PDID), and the address (MSC@) of the mobile switch center MSC/visitor location register (VLR) through which each measuring mobile terminal MMT is connected to the cellular communication network,
   at least one short message service center (SMSC) configured to transmit a message sent (32) by the machine to machine application (M2MA) towards one said measuring mobile terminal (MMT),
   a home location register (HLR) configured to, in response to a demand from the short message service center (SMSC) regarding said one measuring mobile terminal (MMT), request (33) said database (BDD) provide the short message service center (SMSC) with the address of the mobile switch center (MSC)/visitor location register (VLR) through which said one measuring mobile terminal (MMT) is connected to the cellular communication network, the request from the home location register (HLR) provides a private device identifier (PDID) identifying the one measuring mobile terminal (MMT),
   an authentication center (AuC) authenticating said one measuring mobile terminal (MMT),
   the home location register (HLR), the authentication center (AuC) and the short message service center (SMSC) being embedded in a single physical structure forming at least in part the module (MLR),
   wherein the module (MLR) is configured to receive (34) from the database (BDD) said address (MSC@) of the mobile switch center (MSC)/visitor location register (VLR) and the universal single identifier (IMSI) of said one measuring mobile terminal (MMT), and is configured, in response, to transmit to said mobile switch center (MSC)/visitor location register (VLR) the message sent by the machine to machine application (M2MA) based on said address (MSC@) provided by the database (BDD) along with the universal single identifier (IMSI) of said one measuring mobile terminal (MMT) provided by the database (BDD).

2. A module (MLR) according to claim 1, wherein said module (MLR) is configured to create a gathered billing call data record (CDR) for plural connections of a same measuring mobile terminal (MMT) or of a group of measuring mobile terminals (MMT), gathered based on a time duration or based on transmitted data volume.

3. A module (MLR) according to claim 1, wherein the module (MLR) comprises an application gateway (M2MGW) interfaced between the cellular communication network and the machine to machine application (M2MA) and wherein the application gateway (M2MGW) is embedded in said single physical structure.

4. A module (MLR) according to claim 1, wherein said module (MLR) is configured to allocate a temporary public subscriber phone number to individual measuring mobile terminals (MMT), said temporary public subscriber phone number being allocated to the individual measuring mobile terminals (MMT) for a duration limited to an actual connection of the individual measuring mobile terminals (MMT) to the cellular communication network during connection to the cellular communication network, said temporary public subscriber phone number being a MSISDN number.

5. A module (MLR) according to claim 1, wherein said module (MLR) comprises said database (BDD) configured to store a plurality of private device identifier numbers (PDID), private device identifier (PDID) being uniquely allocated to at most one said measuring mobile terminal (MMT), the private device identifier numbers (PDID) being private numbers not accessible to the public, the private device identifier (PDID) being formed by the association of an identifier of the subscription and an identifier of the measuring mobile terminal (MMT), the subscription identifier identifying or describing the owner and its attachment policy and charging rules, the identifier of the measuring mobile terminal (MMT) uniquely identifying the measuring mobile terminal (MMT) in the subscription.

6. A module (MLR) according to claim 1, comprising an accounting database configured to store information related to each connection of a measuring mobile terminal (MMT) and comprising a module mediation optimizer (CMO) configured to:
  receive information related to each connection received at the module (MLR);
  provide said information to the accounting database;
  upon occurrence of a predetermined event, retrieve from the accounting database (ADB) information related to a given mobile measuring terminal (MMT) or to a group of mobile measuring terminals (MMT), said predetermined event being any one of: a predetermined time and date, a predetermined time duration, the reception of an instruction;
  gather said information based on a time duration or based on transmitted data volume;
  create a call data record (CDR) comprising said gathered information; and
  send said call data record (CDR) to a billing system (BSS) of the cellular communication network.

7. A cellular communication network system, comprising a module (MLR) according to claim 1, at least one mobile switching center (MSC)/visitor location register (VLR) and at least one measuring mobile terminal (MMT), said measuring mobile terminal (MMT) comprises means to wireless transmit and receive data and is configured to receive and respectively transmit at least one message to and respectively from the mobile switching center (MSC)/visitor location register (VLR) that is connected to the module (MLR).

8. A cellular communication network system according to claim 7, wherein each of said measuring mobile terminals (MMT) possesses a temporary public subscriber phone number.

9. A cellular communication network system according to claim 7, comprising a further home location register (HLR) that is not embedded in the single physical structure forming at least in part the module (MLR) and wherein the home location register (HLR) embedded in the module (MLR) is dedicated to mobile terminals (MMT).

10. Method of managing of a cellular communication network system comprising a module (MLR) according to claim 1, the method comprising the following steps performed by the module (MLR):
  a step of receiving (32) a message sent by the machine to machine application (M2MA), the received message to be transmitted to a given measuring mobile terminal (MMT), said message comprising a private device identifier (PDID) identifying said measuring mobile terminal (MMT),
  a step of retrieving (3, 34), based at least on said private device identifier (PDID), an address of a mobile switch center (MSC)/visitor location register (VLR) through which said measuring mobile terminal (MMT) is connected to the cellular communication network, and a universal single identifier (IMSI) of said measuring mobile terminal (MMT),
  a step of transmitting (35) said message to the mobile switch center (MSC)/visitor location register (VLR) through which said measuring mobile terminal (MMT) is connected to the cellular communication network, based on the retrieved address and along with the universal single identifier (IMSI).

11. Method according to claim 10, wherein the module (MLR) allocates a public subscriber phone number (MSISDN) for a measuring mobile terminal (MMT) during its connection to the cellular communication network.

12. Method according to claim 10, wherein the module (MLR) executes the following steps for disconnecting the measuring mobile terminal (MMT) from the cellular communication network:
  the module (MLR) receives (37) from a machine to machine (M2MA) a message for disconnecting the measuring mobile terminal (MMT) along with an identifier (PDID, IMSI) of the measuring mobile terminal (MMT);
  based on said identifier (PDID, IMSI) the module (MLR) retrieves (38, 39) from a database the address of a mobile switch center (MSC)/visitor location register (VLR) through which said measuring mobile terminal (MMT) is connected to the cellular communication network;
  the module (MLR) sends (41) to the mobile switch center (MSC)/visitor location register (VLR) for which the address has been retrieved an instruction to disconnect the measuring mobile terminal (MMT) from the cellular communication network.

13. Method according to claim 10, wherein the module (MLR) creates a gathered billing call data record (CDR) for several connections of a same measuring mobile terminal (MMT) gathered based on duration or based on transmitted data volume, the call data record (CDR) comprising at least: a volume of data sent by the measuring mobile terminal (MMT) and an identifier (PDID, IMSI) of the measuring mobile terminal (MMT).

14. Method according to claim 10, wherein the module (MLR) creates a gathered billing call data record (CDR) for several connections of a group of measuring mobile terminals (MMT), gathered based on duration or based on transmitted data volume, the call data record (CDR) comprising a volume of data sent by the group of measuring mobile terminals (MMT) and at least any one of: an identifier of the group of measuring mobile terminals (MMT), an identifier of a subscriber of a machine to machine application processing measurement data created by the group of measuring mobile terminals (MMT).

15. Method according to claim 10, wherein said measuring mobile terminal (MMT) connects to said module (MLR) according to a time division multiple access criterion.

16. Method according to claim 10 wherein at least part of the measuring mobile terminals (MMT) connect to said module (MLR) on a same time.

17. Method according to claim 10, wherein the module (MLR) keeps correspondence between said private device identifier (PDID), a temporary public subscriber phone number (MSISDN) and an international mobile subscriber identity number (IMSI) of said measuring mobile terminal (MMT) while the measuring mobile terminal (MMT) is connected to the network.

18. Method according to claim 10, wherein,
said measuring mobile terminal (MMT) connects to said module (MLR) according to a time division multiple access criterion, and
at least part of the measuring mobile terminals (MMT) connect to said module (MLR) on a same time.

19. A Module (MLR) connected through a cellular communication network to at least a measuring mobile terminal (MMT), at least a mobile switch center (MSC)/visitor location register (VLR) and at least a machine to machine application (M2MA), the module (MLR) comprising:
a database (BDD) storing, for each measuring mobile terminal (MMT): a universal single identifier (IMSI), a private device identifier (PDID), and the address (MSC@) of the mobile switch center MSC/visitor location register (VLR) through which each measuring mobile terminal MMT is connected to the cellular communication network;
a short message service center (SMSC) configured to transmit a message sent (32) by the machine to machine application (M2MA) towards one said measuring mobile terminal (MMT);
a home location register (HLR) configured to, in response to a demand from the short message service center (SMSC) regarding said one measuring mobile terminal (MMT), request (33) said database (BDD) provide the short message service center (SMSC) with the address of the mobile switch center (MSC)/visitor location register (VLR) through which said one measuring mobile terminal (MMT) is connected to the cellular communication network, the request from the home location register (HLR) provides a private device identifier (PDID) identifying the one measuring mobile terminal (MMT);
an authentication center (AuC) authenticating said one measuring mobile terminal (MMT); and
the home location register (HLR), the authentication center (AuC) and the short message service center (SMSC) being embedded in a single physical structure forming at least in part the module (MLR),
wherein the module (MLR) is configured to receive (34) from the database (BDD) said address (MSC@) of the mobile switch center (MSC)/visitor location register (VLR) and the universal single identifier (IMSI) of said one measuring mobile terminal (MMT), and is configured, in response, to transmit to said mobile switch center (MSC)/visitor location register (VLR) the message sent by the machine to machine application (M2MA) based on said address (MSC@) provided by the database (BDD) along with the universal single identifier (IMSI) of said one measuring mobile terminal (MMT) provided by the database (BDD), and
wherein the module (MLR) is non-transitory.

20. A method of managing of a cellular communication network system, comprising the steps of:
connecting a non-transitory module (MLR) through the cellular communication network to plural measuring mobile terminal (MMT)s, a mobile switch center (MSC)/visitor location register (VLR) and a machine to machine application (M2MA);
having the module (MLR) use a database (BDD) storing, for each measuring mobile terminal (MMT): a universal single identifier (IMSI), a private device identifier (PDID), and the address (MSC@) of the mobile switch center MSC/visitor location register (VLR) through which each measuring mobile terminal MMT is connected to the cellular communication network;
from a short message service center (SMSC) of the module (MLR), transmitting a message sent (32) by the machine to machine application (M2MA) towards one of said measuring mobile terminals (MMT);
with a home location register (HLR) of the module (MLR), in response to a demand from the short message service center (SMSC) regarding said one measuring mobile terminal (MMT), requesting (33) said database (BDD) to provide the short message service center (SMSC) with the address of the mobile switch center (MSC)/visitor location register (VLR) through which said one measuring mobile terminal (MMT) is connected to the cellular communication network, the request from the home location register (HLR) providing a private device identifier (PDID) identifying the one measuring mobile terminal (MMT);
with an authentication center (AuC) of the module (MLR), authenticating said one measuring mobile terminal (MMT),
wherein the home location register (HLR), the authentication center (AuC) and the short message service center (SMSC) are embedded in a single physical structure forming at least in part the module (MLR);
having the module (MLR) receive (34) from the database (BDD) said address (MSC@) of the mobile switch center (MSC)/visitor location register (VLR) and the universal single identifier (IMSI) of said one measuring mobile terminal (MMT), and, in response, to transmit to said mobile switch center (MSC)/visitor location register (VLR) the message sent by the machine to machine application (M2MA) based on said address (MSC@) provided by the database (BDD) along with the universal single identifier (IMSI) of said one measuring mobile terminal (MMT) provided by the database (BDD).

* * * * *